United States Patent [19]

Gerber

[11] Patent Number: 4,577,881
[45] Date of Patent: Mar. 25, 1986

[54] IMPLEMENT HITCH ASSEMBLY

[76] Inventor: Jerome J. Gerber, Rte. 1, Box 32, Murdock, Kans. 67211

[21] Appl. No.: 746,274

[22] Filed: Jun. 19, 1985

[51] Int. Cl.⁴ .............................................. B60D 1/00
[52] U.S. Cl. .................................... 280/412; 172/311
[58] Field of Search ........... 280/411 A, 411 R, 411 C, 280/412, 413; 172/310, 311, 313, 314, 282; 56/2, 6

[56]  References Cited

U.S. PATENT DOCUMENTS

Re. 19,550  4/1935  Johnson .............................. 280/412
3,112,124  11/1963  Bartel ................................. 280/412
4,178,010  12/1979  Gerber ................................ 280/412
4,381,118   4/1983  Weeks ................................. 280/412

Primary Examiner—John J. Love
Assistant Examiner—Donn McGiehan
Attorney, Agent, or Firm—Edwin H. Crabtree

[57]  ABSTRACT

An improved implement hitch assembly attached to the rear of a self-propelled pulling vehicle. The hitch assembly used for towing a front and rear agriculture implement such as a grain drill in a tandem position when traveling on a roadway and when in the field towing the implements in a side by side position.

9 Claims, 6 Drawing Figures

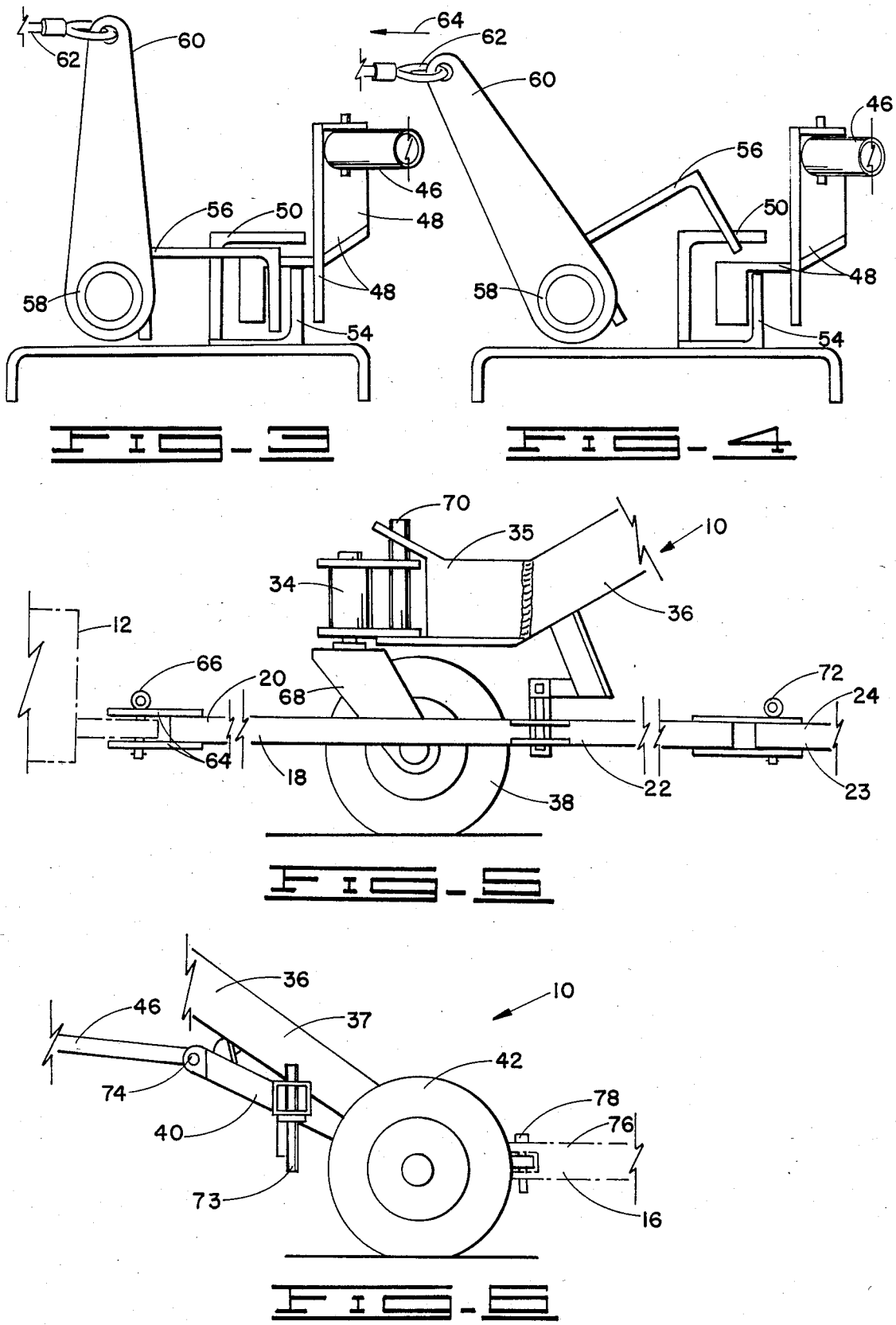

IMPLEMENT HITCH ASSEMBLY

BACKGROUND OF THE INVENTION

This invention relates to an improved implement hitch assembly and more particularly but not by way of limitation to an implement hitch assembly used for towing a pair of implements in a tandem position when on a roadway and in a side by side position when in a field.

Heretofore, there have been various types of implement hitches or implement draw bars such as the devices described in U.S. Pat. No. 2,971,744 to Bartel, U.S. Pat. No. 3,292,948 to McMasters et al, U.S. Pat. No. 3,008,732 to Raney and U.S. Pat. No. 3,516,500 to Butler. The hitches and draw bars described in the above-mentioned patents, while operating mechanically for pulling implements therebehind do not provide the unique features and advantages of the subject invention as described herein.

In U.S. Pat. No. 3,112,124 to Bartel and U.S. Pat. No. 3,738,652 to Ritter, two popular types of implement draw bars and hitches are disclosed for pulling grain drills, plows and the like. This equipment is hydraulically operated and again does not provide the structural advantages of the subject invention. Further, the subject invention is a substantial improvement over an implement hitch assembly described in U.S. Pat. No. 4,178,010 and owned by the subject inventor.

SUMMARY OF THE INVENTION

The improved implement hitch assembly is a heavy duty two-implement hitch which is mechanically operated. The hitch assembly eliminates the need of using hydraulic controls for removing the implements from a tandem position to a side by side position or the need of manually releasing pins and moving draw bars to arrange a pair of implements from a tandem position to a side by side field position and then back to the tandem position.

Through the use of simple mechanical linkage by a pull rope attached to a release latch, the rear implement can be quickly moved from a position behind the front implement used in traveling down a roadway with the overall width being no greater than the individual widths of the implements to a side by side position when the implements are used in the field.

The structural design of the improved hitch assembly eliminates the need of more than two assembly wheels, additional latches and chains for relieving excessive pressure during right and left hand turns as described in U.S. Pat. No. 4,178,010.

The assembly is rugged in construction, mechanical in operation, eliminating the need of hydraulic cylinders, simple in design and can be quickly installed and used with various types of farm implements.

The improved implement hitch assembly for attaching to the rear of a self-propelled vehicle and towing a front implement and a rear implement includes a hitch bar having a first end adapted to pivot attachment to the pulling vehicle. A second end of the hitch bar is attached to a draw bar made up of a stationary brace and a pivot brace mounted on the front of the first implement. The pivot brace and the first end of a side bar are mounted on a front wheel. The second end of the side bar is mounted on a rear wheel and pivotally attached to the rear implement. A pivot arm is pivotally attached to the side bar and the hitch bar. A slide arm has one end pivotally attached to the side bar and attached to a slide means attached to the rear of the first implement. By releasing the slide means, the rear implement is allowed to move from a tandem position to a side by side field position.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 illustrates the latch and angle slide taken along lines 3—3 shown in FIG. 1.

FIG. 4 illustrates the latch in a raised position for releasing a slide flange and slide arm.

FIG. 5 illustrates a side view of a portion of the front of the assembly taken along lines 5—5 shown in FIG. 1.

FIG. 6 illustrates a portion of the assembly taken along lines 6—6 shown in FIG. 1.

DETAILED DESCRIPTION OF THE DRAWINGS

Figure 1:
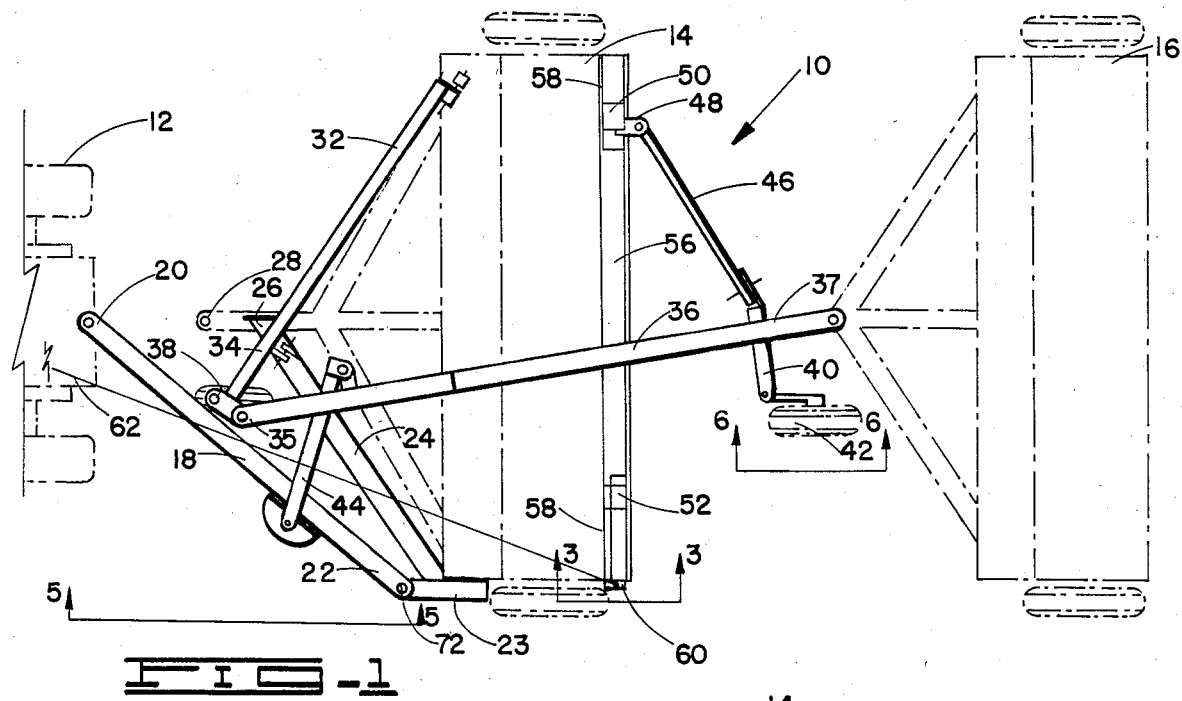
FIG. 1 illustrates a top view of the improved implement hitch assembly attached to the rear of a pulling vehicle and to a front and rear implement shown in dotted lines and in a tandem position.
Figure 2:
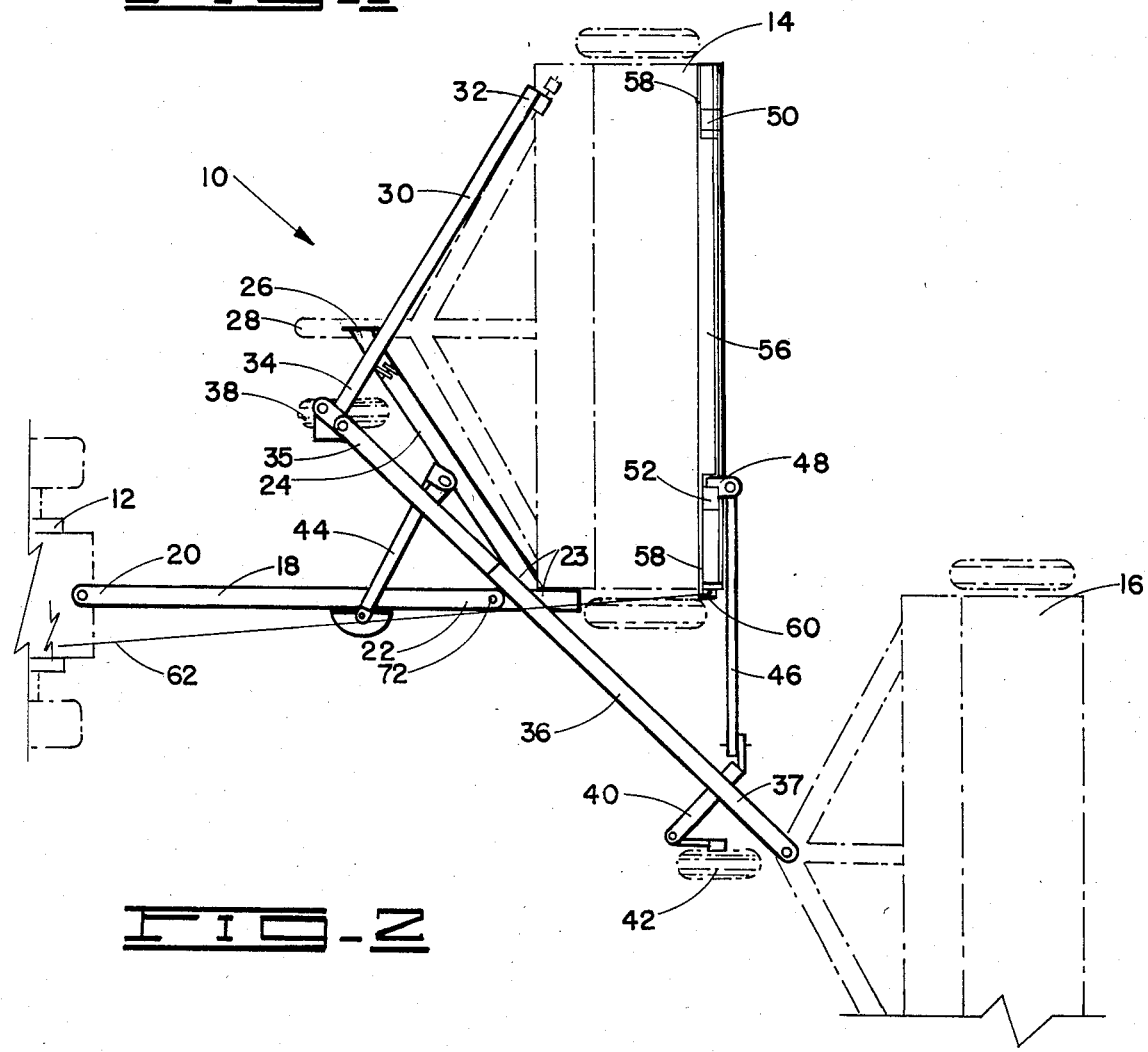
FIG. 2 illustrates a top view of the assembly with the front and rear implements in a side by side field position.

In FIG. 1 and FIG. 2 the improved implement hitch assembly is designated by general reference numeral 10. The assembly 10 is adapted for attachment to the rear of a self-propelled pulling vehicle 12 shown in dotted lines. The assembly 10 is used for towing a front agricultural implement 14 and a rear implement 16 shown in dotted lines and in a tandem position shown in FIG. 1. The two implements 14 and 16 are shown in a side by side field position in FIG. 2. When in a tandem position as shown in FIG. 1, the implements may be pulled by the vehicle 12 down a roadway with the width no greater than the width of the implements for safe passage on the road.

The assembly 10 includes a hitch bar 18 having a first end 20 adapted for pivot attachment to the pulling vehicle 12. A second end 22 of the hitch bar 18 is pivotally attached to a first end 23 of a stationary brace 24. The stationary brace 24 is mounted on front of the implement 14 and extends forward with a second end 26 mounted on a pulling tongue 28 of the implement 14. The stationary brace 24 is pivotally attached to a pivot brace 30 having a first end 32 pivotally attached to the opposite side of the implement 14 and a second end 34 pivotally attached to a first end 35 of side bar 36 and mounted on a front wheel 38. It should be noted the stationary brace 24 and pivot brace 30 are disposed laterally to the direction of travel and are combined to provide a draw bar for pulling the front implement 14 when connected to the hitch bar 18.

The side bar 36 is used for pulling the second implement 16 and extends upwardly and over the first implement 14 when in a tandem position as shown in FIG. 1. A second end 37 of the side bar 36 is pivotally attached to the rear implement 16 and mounted to a wheel bracket 40 of a rear wheel 42. A pivot arm 44 is pivotally attached to the front of the side bar 36 and pivotally attached to the hitch bar 18.

Attached to the rear of the side bar 36 and the rear wheel mounting bracket 40 is a slide arm 46 having a donwardly extending slide flange 48 which is held in place by keepers 50 and 52 mounted on the opposite sides and the rear of the front implement 14. The bottom of the flange 48 is "U" shaped as seen in FIGS. 3 and 4 and is received over a lip of a "L" shaped angle slide 54 which extends along the length of the rear of the implement 14 and attached thereto. An inverted "C" shaped latch 56 is disposed adjacent the slide 54 and mounted on a latch pivot arm 58 with one end of the pivot arm 58 attached to an upright latch handle 60 which is connected to a pull rope 62 which extends forward to the pulling vehicle 12 for operation by the operator of the pulling vehicle 12.

Referring now to FIG. 3 a side view taken along lines 3—3 in FIG. 1 is shown. In this position, the latch handle 60 is upright and connected to the pull rope 62. The inverted "U" shaped latch 56 is in a down position adjacent the angle slide 54 with the downwardly extending flange 48 at the opposite end of the angle slide 54 and held in place by the keeper 50.

When it is desired to move the rear implement 16 from a tandem position into a field position as shown in FIG. 2, the operator pulls the pull rope 62 as indicated by arrow 64 moving the latch handle 60 to the left with the pivot arm 58 rotating the inverted "C" shaped latch 56 upwardly at the same time, the operator of the pulling vehicle 12 will now move the vehicle 12 and implements slightly to the right and then to the left urging the slide flange 48 to slide along the top and the length of the angle slide 54. As this occurs, the slide arm 46 moves sideways toward the rear of the front implement 14 and the side bar 36 and rear wheel 42 swing to the left, moving the rear implement 16 into a side by side position as shown in FIG. 2.

The slide arm 46 and flange 48 are moved all the way to the left of the rear of the front implement 14. The flange 38 moves underneath the keeper 52 and the operator releases the pull rope 62 with the latch 60 moving back to an upright position as shown in FIG. 3 and the latch 56 is lowered adjacent the angle slide 54 with the flange 48 held in place underneath the keeper 50 and adjacent the other side of the latch 56. When it is desired to again return the rear implement 16 to a tandem position, the operator agains uses the pull rope 62 to raise the latch 56 and by moving the pulling vehicle 12 slightly to the left and then to the right, the flange 48 with slide arm 46 moves along the rear of the front implement 14 with the flange 48 sliding on top of the angle slide 54 until it returns again to its position on the right rear side of the implement 14 and underneath the keeper 50 as shown in FIG. 1.

In FIG. 5 a side view of the front of the assembly 10 is shown taken along lines 5—5 shown in FIG. 1. In this view, the first end 20 of the hitch bar 18 can be seen having a tongue hitch 64 with pin 66 for pivot connection to the vehicle 12. Also shown in this view is the front wheel 38 with wheel bracket 68 pivotally attached to the second end 34 of the pivot brace 30. Also the side bar 36 with first end 35 can be seen pivotally attached by a pivot pin 70 to a second end 34 of the pivot brace 32. In this Fig. the second end 22 of the hitch bar 18 is pivotally attached by a pin 72 to the first end 23 of the stationary bracket 24.

In FIG. 6 a side view of a portion of the assembly 10 is shown taken along lines 6—6 shown in FIG. 1. In this view, the rear wheel 42 can be seen pivotally attached by pin 73 to the wheel bracket 40. The bracket 40 is welded to the bottom of the second end 37 of the side bar 36. One end of the bracket 40 is pivotally attached to the slide arm 46 by pin 74. Also shown is the second end 37 of the side bar 36 pivotally attached to a pulling tongue 76 of the rear implement 16 by a pin 78.

Changes may be made in the construction and arrangment of the parts or elements of the embodiments as described herein without departing from the spirit or scope of the invention defined in the following claims.

What is claimed is:

1. An improved implement hitch assembly attached to the rear of a self-propelled pulling vehicle, the assembly towing a front implement and a rear implement in a tandem position when traveling on a roadway, the assembly towing the front implement in a side by side position with the rear implement when in the field, the assembly comprising:

a hitch bar having a first end adapted for pivot attachment to the pulling vehicle and a second end;

a draw bar laterally disposed to the direction of travel and mounted on the front of the first implement, the draw bar pivotally attached to the second end of the hitch bar, the draw bar mounted on a front wheel;

a side bar having a first end pivotally attached to the draw bar and a second end mounted on a rear wheel, the rear implement pivotally attached to the second end of the side bar;

a pivot arm havng a first end pivotally attached to the side bar and a second end pivotally attached to the hitch bar;

slide means attached to the rear of the first implement and the side bar for holding the rear implement in a tandem position; and release means attached to the slide means for releasing the slide means and allowing the rear implement to move into a side by side position with the front implement.

2. The assembly as described in claim 1 wherein the draw bar includes a stationary brace having one end attached to one side of the first implement and extending forward with the second end attached to a pulling tongue of the implement, a pivot brace having one end pivotally attached to the other side of the first implement and extending forward and pivotally attached to the second end of the stationary brace, the first end of the side bar pivotally attached to the second end of the pivot brace.

3. The assembly as described in claim 1 wherein the slide means includes a slide arm having one end pivotally attached to the second end of the side bar and the second end pivotally attached to a downwardly extending "U" shaped slide flange disposed above and opposite side of an "L" shaped angle slide attached to the rear of the first implement and extending along the length thereof.

4. The assembly as described in claim 3 wherein the release means includes an upwardly extending latch handle pivotally attached to an inverted "C" shaped channel latch disposed adjacent the "L" shaped angle slide when the latch handle raises the latch slide flange moves along the length of the "L" shaped angle for moving the rear implement from a tandem position to a side by side position.

5. The assembly as described in claim 4 further including keepers mounted adjacent the opposite sides of the angle slide for holding the slide flange in place when the rear implement is in a tandem or field position.

6. An improved implement hitch assembly attached to the rear of a self-propelled pulling vehicle, the assembly towing a front implement and a rear implement in a tandem position when traveling on a roadway, the assembly towing the front implement in a side by side position with the rear implement when in the field, the assembly comprising:

a hitch bar having a first end adapted for pivot attachment to the pulling vehicle and a second end;

a draw bar laterally disposed to the direction of travel and mounted on the front of the first implement, the draw bar pivotally attached to the second end of the hitch bar, the draw bar mounted on a front wheel;

a side bar having a first end pivotally attached to the draw bar and a second end mounted on a rear wheel, the rear implement pivotally attached to the second end of the side bar;

a pivot arm having a first end pivotally attached to the side bar and a second end pivotally attached to the hitch bar;

a slide arm having one end pivotally attached to the side bar and a second end pivotally attached to a downwardly extending "U" shaped slide flange, the slide flange received over an "L" shaped angle slide attached to the rear of the first implement and extending along the length thereof;

a latch handle pivotally attached to an inverted "C" shaped channel latch disposed adjacent the angle slide, the latch pivotally attached to the rear of the first implement, the latch handle when raising the latch allowing the slide flange to move along the length of the angle slide for moving the rear implement from a tandem position to a side by side position.

7. The assembly as described in claim 6 further including a pull rope attached to the latch handle, the rope extending to the pulling vehicle for allowing the operator of the vehicle to pull the latch handle and raise and lower the channel latch when moving the rear implement from a tandem position to a side by side position and then back to a tandem position.

8. The assembly as described in claim 6 wherein the draw bar includes a stationary brace having one end attached to one side of the first implement and extending forward with the second end attached to a pulling tongue of the implement, a pivot brace having one end pivotally attached to the other side of the first implement and extending forward and pivotally attached to the second end of the stationary brace, the first end of the side bar pivotally attached to the second end of the pivot brace, the second end of the pivot brace and the first end of the side bar disposed above and attached to the front wheel of the assembly.

9. The assembly as described in claim 6 further including keepers mounted on the rear of the front implement and adjacent the opposite sides of the angle slide and disposed above the slide flange for holding the slide flange in place when the rear implement is either in a tandem position or in a field position.

* * * * *